US012240450B2

United States Patent
Horiuchi et al.

(10) Patent No.: US 12,240,450 B2
(45) Date of Patent: Mar. 4, 2025

(54) V2X WARNING SYSTEM FOR IDENTIFYING RISK AREAS WITHIN OCCLUDED REGIONS

(71) Applicant: HONDA MOTOR CO., LTD., Tokyo (JP)

(72) Inventors: Moriya Horiuchi, Saitama (JP); Shigeru Inoue, Saitama (JP); Takahiro Kurehashi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 362 days.

(21) Appl. No.: 17/831,405

(22) Filed: Jun. 2, 2022

(65) Prior Publication Data
US 2022/0388506 A1   Dec. 8, 2022

(30) Foreign Application Priority Data

Jun. 8, 2021 (JP) .................................. 2021-096119

(51) Int. Cl.
*B60W 30/095* (2012.01)
*B60W 50/14* (2020.01)
*G06V 20/58* (2022.01)

(52) U.S. Cl.
CPC ........ *B60W 30/0956* (2013.01); *B60W 50/14* (2013.01); *G06V 20/58* (2022.01); *B60W 2050/146* (2013.01); *B60W 2420/403* (2013.01); *B60W 2554/4029* (2020.02); *B60W 2554/4041* (2020.02)

(58) Field of Classification Search
None
See application file for complete search history.

(56) References Cited

U.S. PATENT DOCUMENTS

| | | |
|---|---|---|
| 2010/0214085 A1 | 8/2010 | Avery |
| 2016/0335892 A1 | 11/2016 | Okada |
| (Continued) | | |

FOREIGN PATENT DOCUMENTS

| | | |
|---|---|---|
| CN | 104112371 A | 10/2014 |
| CN | 106062852 A | 10/2016 |
| (Continued) | | |

OTHER PUBLICATIONS

Office Action issued for counterpart Chinese Application 202210473486.5, issued by the State Intellectual Property Office of People's Republic of China on May 10, 2023.

(Continued)

*Primary Examiner* — James J Lee
*Assistant Examiner* — Jonathan E Reinert

(57) ABSTRACT

There is provided a control apparatus that identifies an area for which an analysis is not required based on information of an image captured from a position of a movable object, identifies a first time period that is a time period for the movable object to reach the identified area, calculates a second time period that is an arrival time period to reach a movement area of the movable object from a position in the identified area, sets, in the identified area, a risk area where an object approaching the movable object may be present based on the first time period and the second time period and on the identified area, and controls transmission of risk area information.

19 Claims, 8 Drawing Sheets

(56) References Cited

U.S. PATENT DOCUMENTS

| | | |
|---|---|---|
| 2018/0042039 A1 | 2/2018 | Senba |
| 2019/0080182 A1 | 3/2019 | Oe |
| 2019/0287394 A1 | 9/2019 | Aoude |
| 2019/0325751 A1 | 10/2019 | Altintas |
| 2020/0278681 A1* | 9/2020 | Gier ........................ G06V 20/56 |
| 2022/0185267 A1* | 6/2022 | Beller ............... B60W 30/0956 |
| 2023/0021615 A1* | 1/2023 | Inaba ...................... F16D 61/00 |

FOREIGN PATENT DOCUMENTS

| | | |
|---|---|---|
| CN | 108091154 A | 5/2018 |
| CN | 109493641 A | 3/2019 |
| CN | 109979237 A | 7/2019 |
| CN | 110392336 A | 10/2019 |
| CN | 110544390 A | 12/2019 |
| CN | 111540191 A | 8/2020 |
| CN | 112141099 A | 12/2020 |
| CN | 112154492 A | 12/2020 |
| JP | 2017114405 A | 6/2017 |
| JP | 2018022391 A | 2/2018 |

OTHER PUBLICATIONS

Office Action issued for counterpart Chinese Application 202210473486.5, issued by the State Intellectual Property Office of People's Republic of China on Apr. 4, 2024.

\* cited by examiner

V2X WARNING SYSTEM FOR IDENTIFYING RISK AREAS WITHIN OCCLUDED REGIONS

The contents of the following Japanese patent application(s) are incorporated herein by reference:
NO. 2021-096119 filed on Jun. 8, 2021.

BACKGROUND

1. Technical Field

The present invention relates to a control apparatus, a movable object, a control method, and a computer-readable storage medium.

2. Related Art

Patent document 1 describes an information processing apparatus for transmitting, when it is judged that transmission of information is required based on a position of an in-vehicle terminal, the information to a terminal having a predetermined priority among a plurality of terminals.

LIST OF CITED REFERENCES

Patent document 1: Japanese Patent Application Publication No. 2018-022391

BRIEF DESCRIPTION OF THE DRAWINGS

FIG. 3 conceptually illustrates position information of a risk area which is managed by a control apparatus 24a.

FIG. 7 is a flowchart related to a control method executed by the control apparatus 24a in the vehicle 20a.

DESCRIPTION OF EXEMPLARY EMBODIMENTS

Hereinafter, the present invention will be described through embodiments of the invention, but the following embodiments do not limit the invention according to the claims. In addition, not all combinations of the features described in the embodiments necessarily have to be essential to solving means of the invention.

Figure 1:
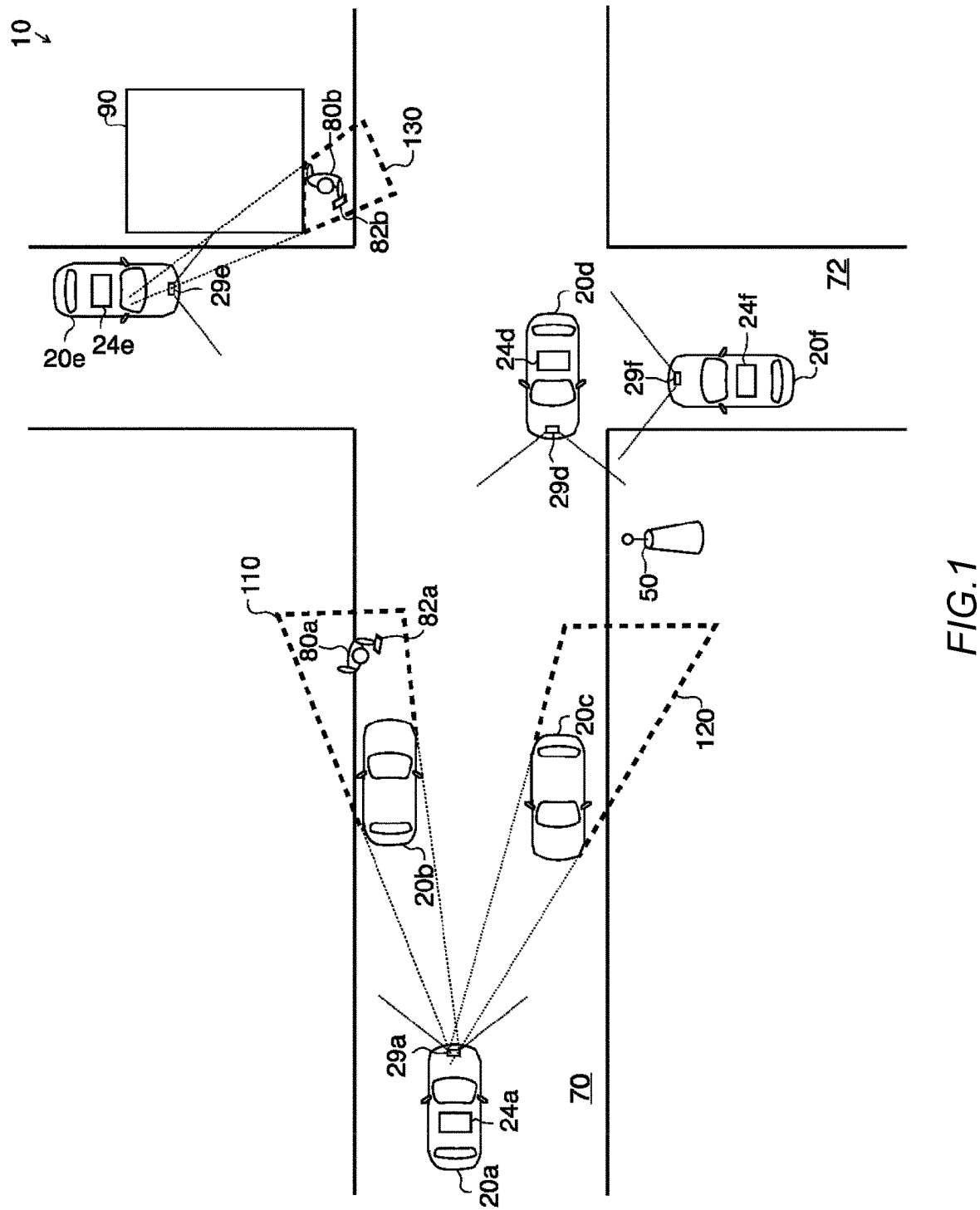
FIG. 1 schematically illustrates a usage scene of a warning system 10.

FIG. 1 schematically illustrates a usage scene of a warning system 10. The warning system 10 includes a vehicle 20a, a vehicle 20b, a vehicle 20c, a vehicle 20d, a vehicle 20e, and a vehicle 20f, and a terminal 82a and a terminal 82b.

According to the present embodiment, the vehicle 20a, the vehicle 20b the vehicle 20c, the vehicle 20d, the vehicle 20e, and the vehicle 20f may be collectively referred to as a "vehicle 20". The vehicle 20 is one example of a movable object. In addition, the terminal 82a and the terminal 82b are terminals respectively possessed by a pedestrian 80a and a pedestrian 80b. According to the present embodiment, the pedestrian 80a and the pedestrian 80b may be collectively referred to as a "pedestrian 80". In addition, the terminal 82a and the terminal 82b may be collectively referred to as a "terminal 82".

The vehicle 20a includes a sensor 29a and a control apparatus 24a. The sensor 29a is configured to include a camera. The control apparatus 24a includes a processing function of information acquired by the sensor 29a, and a communication function. It should be noted that in the present embodiment, any one of suffixes (such as "a", "e", and "f") of reference signs of the vehicles 20 is assigned to an end of a reference sign of a component (for example, a sensor 29 and a control apparatus 24) included in the vehicle 20 to distinguish the component to be included in which one of the vehicles 20.

In FIG. 1, the vehicle 20a is a vehicle traveling along a road 70. The vehicle 20b is a vehicle parked on the road 70. For the vehicle 20a, an area 110 on an advancing direction side of the vehicle 20a in front of the parked vehicle 20b is an area difficult to be visually recognized from a position of the vehicle 20a. In addition, the vehicle 20c is a vehicle travelling along an oncoming lane of the road 70 when viewed from the vehicle 20a. An area 120 on the advancing direction side of the vehicle 20a behind the vehicle 20c is an area difficult to be visually recognized from the position of the vehicle 20a. Therefore, the control apparatus 24a is configured to detect the area 110 and the area 120 that are not on a line of sight from the vehicle 20a as a risk area from an image in the advancing direction which has been acquired by the sensor 29a. The control apparatus 24a transmits risk area information including position information of the areas 110 and 120 by wireless communication.

In FIG. 1, the vehicle 20d is an oncoming vehicle for the vehicle 20a, and is a vehicle traveling in a position from which the area 110 and the area 120 can be visually recognized. When a control apparatus 24d of the vehicle 20d receives the risk area information transmitted from the vehicle 20a, the control apparatus 24d determines whether a pedestrian is present in each of the area 110 and the area 120 from an image acquired by a sensor 29d. When it is detected that the pedestrian 80a is present in the area 110 from the image acquired by the sensor 29d, the control apparatus 24d transmits response information indicating the presence of the pedestrian in the area 110 to the vehicle 20a by the wireless communication. In addition, when it is detected that a pedestrian is absent in the area 120 from the image acquired by the sensor 29d, the control apparatus 24d transmits the response information indicating the absence of the pedestrian in the area 120 to the vehicle 20a by the wireless communication.

When the risk area information transmitted from the vehicle 20a is received, the terminal 82a is configured to determine whether a current position of the terminal 82a is in the area 110. When it is determined that the current position of the terminal 82a is in the area 110, the terminal 82a transmits the response information indicating the presence of the terminal 82a in the area 110 to the vehicle 20a by the wireless communication. In addition, the terminal 82a outputs warning information for the pedestrian 80a.

In the vehicle 20a, when the response information indicating the presence of the pedestrian in the area 110 is received from the vehicle 20d, the control apparatus 24a performs warning display. In addition, when the response information is received from the terminal 82a, the control apparatus 24a performs warning display for an occupant of the vehicle 20a.

It should be noted that in FIG. 1, it is difficult to visually recognize an area 130 from, for example, a position of the vehicle 20*e* traveling on the road 72, due to presence of a construction 90 as an obstruction. For this reason, a control apparatus 24*e* of the vehicle 20*e* is configured to judge the area 130 as the risk area, and transmit risk area information including position information of the area 130 by the wireless communication.

In FIG. 1, the vehicle 20*f* is an oncoming vehicle for the vehicle 20*e*, and is a vehicle stopping at a position from which the area 130 can be visually recognized. When the risk area information transmitted from the vehicle 20*e* is received, a control apparatus 24*f* of the vehicle 20*f* is configured to determine whether a pedestrian is present in the area 130 from an image acquired by a sensor 29*f*. When it is detected that the pedestrian 80*b* is present in the area 130 from the image acquired by the sensor 29*f*, the control apparatus 24*f* transmits the response information indicating the presence of pedestrian in the area 130 to the vehicle 20*e* by the wireless communication. In addition, when the risk area information is received, the terminal 82*b* is configured to determine whether a current position of the terminal 82*b* is in the area 130, and when it is determined that the current position is in the area 130, the terminal 82*b* transmits the response information indicating the presence of the terminal 82*b* in the area 130 to the vehicle 20*e* by the wireless communication. In addition, the terminal 82*b* outputs warning information for the pedestrian 80*b*.

In the vehicle 20*e*, when the response information indicating the presence of the pedestrian in the area 130 is received from the vehicle 20*f*, the control apparatus 24*e* performs the warning display. In addition, when the response information is received from the terminal 82*b*, the control apparatus 24*e* performs the warning display for an occupant of the vehicle 20*e*.

In this manner, the control apparatus 24 is configured to judge such a non-line-of-sight area that becomes a blind corner from its own vehicle as the risk area, and transmit risk area information including position information of the risk area to another vehicle by the wireless communication. When the risk area information is received, the other vehicle determines whether a pedestrian is present in the risk area, and transmits the response information indicating the presence of the pedestrian in the risk area by the wireless communication. In addition, when its own terminal is present in the risk area, the terminal 82 transmits the response information by the wireless communication. When the response information from the terminal 82 of the pedestrian or the other vehicle is received, the control apparatus 24 performs the warning display for an occupant of the vehicle 20. Thus, notification of the risk area where it is not possible be recognized by the vehicle 20 or the pedestrian 80 can be appropriately performed. The risk area is a recognition of a state related to an external environment recognized by the vehicle 20 or the control apparatus 24. The risk area may be, for example, an area where there is a risk for the pedestrian 80 or the vehicle 20. The risk area may be, for example, an area where it is necessary to perform a safety check for the pedestrian 80 or the vehicle 20.

It should be noted that communication between the control apparatus 24 and the terminal 82 and the control apparatus 24 of the other vehicle 20 is executed by direct communication. For example, the control apparatus 24 performs the direct communication with the terminal 82 and the control apparatus 24 of the other vehicle 20 by short distance direct communication in Cellular-V2X. Examples of the short distance direct communication in Cellular-V2X include a communication method such as LTE-V2X PC5 or 5G-V2X PC5 (according to the present embodiment, which will be abbreviated as "PC5"). A mode using Wi-Fi (registered trademark) or dedicated short range communications (DSRC) may be adopted as the direct communication. The control apparatus 24 may perform the direct communication via a base transceiver station 50. Any direct communication method such as Bluetooth (registered trademark) other than Cellular-V2X or DSRC (registered trademark) may be adopted as the direct communication. The control apparatus 24 may perform the direct communication with the terminal 82 and the control apparatus 24 of the other vehicle 20 using a communication infrastructure included in intelligent transport systems (ITS).

It should be noted that in the present embodiment, for ease of the description, a case will be considered where it is determined on whether a pedestrian is present in a risk area. The pedestrian refers to a person who can make a passage on a road by means other than a vehicle. The pedestrian includes a person who makes a passage on a road using a wheel chair or the like. However, it may be determined on whether not only the pedestrian but also any movable object such as a person other than the pedestrian or another vehicle is present in the risk area. The person other than the pedestrian may include a person aboard a stopped vehicle.

Figure 2:
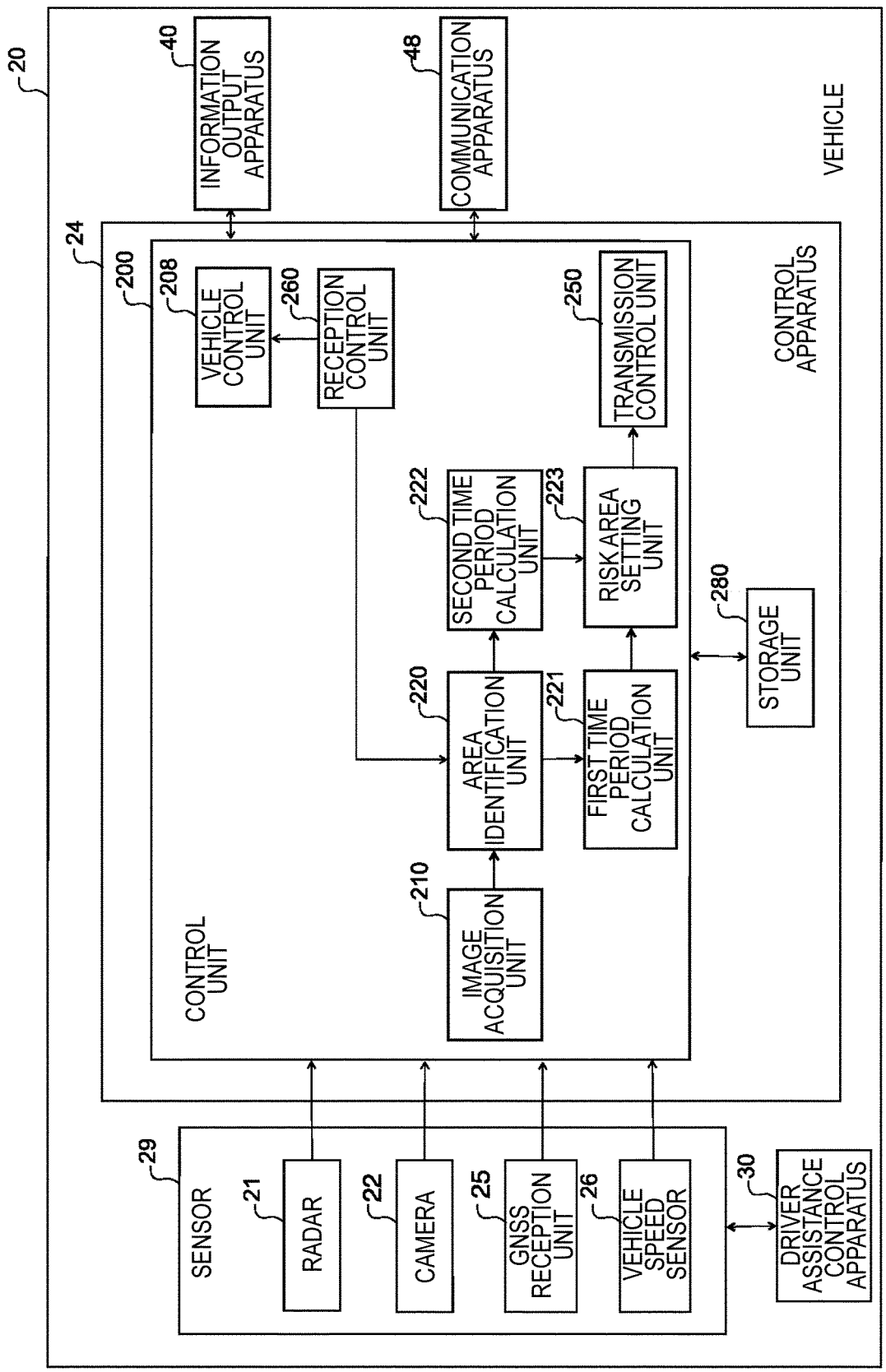
FIG. 2 illustrates a system configuration of a vehicle 20.

FIG. 2 illustrates a system configuration of the vehicle 20. The vehicle 20 includes the sensor 29, a driver assistance control apparatus 30, the control apparatus 24, a communication apparatus 48, and an information output apparatus 40.

The sensor 29 includes a radar 21, a camera 22, a GNSS reception unit 25, and a vehicle speed sensor 26. The radar 21 may be a LiDAR, a millimeter wave radar, or the like. The GNSS reception unit 25 is configured to receive radio waves transmitted from a GNSS satellite. The GNSS reception unit 25 generates information indicating a current position of the vehicle 20 based on a signal received from the GNSS satellite. The camera 22 is one example of an image pickup unit mounted on the vehicle 20. The camera 22 is configured to generate image information by picking up an image of a surrounding of the vehicle 20. For example, the camera 22 generates the image information by picking up an image in the advancing direction of the vehicle 20. The camera 22 may be a single-lens camera. The camera 22 may be a multi-lens camera, and may be a camera that can acquire information of a distance to an object. It should be noted that the sensor 29 may include a position sensor such as an odometer, or an inertial measurement unit (IMU) such as an acceleration sensor or an orientation sensor.

The driver assistance control apparatus 30 is configured to perform driver assistance of the vehicle 20 using information detected by the sensor 29. The driver assistance control apparatus 30 may be realized by an ECU having a function of advanced driver-assistance systems (ADAS).

The communication apparatus 48 is responsible for performing the direct communication between the terminal 82 and the other vehicle 20. For example, the communication apparatus 48 is responsible for performing the wireless communication based on PC5.

The control apparatus 24 includes a control unit 200 and a storage unit 280. The control unit 200 is realized, for example, by a circuit such as an arithmetic processing apparatus including a processor. The storage unit 280 is realized by including a nonvolatile storage medium. The control unit 200 is configured to perform processing using information stored in the storage unit 280. The control unit 200 may be realized by an electronic control unit (ECU)

including a microcomputer provided with a CPU, a ROM, a RAM, an I/O, a bus, and the like.

The control unit 200 includes an image acquisition unit 210, an area identification unit 220, a first time period calculation unit 221, a second time period calculation unit 222, a risk area setting unit 223, a vehicle control unit 208, a transmission control unit 250, and a reception control unit 260. It should be noted that a mode may be adopted where the control unit 200 does not have a part of functions in a functional block illustrated in FIG. 2. For example, a mode may be adopted where only a function of the risk area setting unit 223 is implemented in the control unit 200, and other functions such as the area identification unit 220, the first time period calculation unit 221, and the second time period calculation unit 222 are implemented as functions of other circuits such as the sensor 29.

The image acquisition unit 210 is configured to acquire image information of an image outside of the vehicle 20. The image acquisition unit 210 acquires an image from the camera 22 installed in the vehicle 20.

The area identification unit 220 is configured to identify an area for which an analysis is not required based on image information acquire by the image acquisition unit 210 from a position of the vehicle 20. The area for which the analysis is not required is an area that is not on the line of sight from the position of the vehicle 20, for example. The area that is not on the line of sight when viewed from the position of the vehicle 20 is, for example, position information of an area where an occlusion occurs through shielding by a three-dimensional object such as a construction or the other vehicle 20 being stopped. The area identification unit 220 may identify a non-line-of-sight area based on the image information and map information. The area identification unit 220 may receive position information of a non-line-of-sight area which has been transmitted from an external apparatus such as the other vehicle 20 or the base transceiver station 50, and identify the non-line-of-sight area based on the received position information of the non-line-of-sight area. The external apparatus may be the other vehicle 20 passing through a position near the vehicle 20 or a server configured to collect the position information of the non-line-of-sight area. The server configured to collect the position information of the non-line-of-sight area may be a mobile edge computing (MEC) server connected to the base transceiver station 50. The MEC server may hold the position information of the non-line-of-sight area which is transmitted from a plurality of vehicles passing nearby, and transmit the held position information of the non-line-of-sight area to the vehicle 20 passing nearby.

The first time period calculation unit 221 is configured to identify a first time period that is a time period for the vehicle 20 to reach the area identified by the area identification unit 220. The second time period calculation unit 222 is configured to calculate a second time period that is an arrival time period to reach a movement area of the vehicle 20 from a position in the area identified by the area identification unit 220. The risk area setting unit 223 is configured to set a risk area where an object approaching the vehicle 20 may be present in the area identified by the area identification unit 220 based on the first time period and the second time period and on the area identified by the area identification unit 220. The transmission control unit 250 is configured to control transmission of risk area information including position information of the risk area.

It should be noted that the position information of the risk area may include a plurality of pieces of coordinate information indicating a range of the risk area. The position information may be coordinate information representing a geographic position. When the risk area is polygonal, the plurality of coordinate information may be coordinate information of vertices of a polygon. The position information may include coordinate information and distance information from a position indicated by the coordinate information. For example, the position information may include coordinate information of a specific point of the risk area and distance information representing a size of the risk area while the point is set as a reference. The coordinate information may be latitude and longitude coordinate information.

The area identification unit 220 judges that the area is not on the line of sight by recognizing a specific object using an image. The specific object is, for example, another vehicle, a street tree, and a construction such as a building.

The transmission control unit 250 may transmit, without designating a destination, risk area information including a plurality of latitude and longitude coordinates indicating the risk area. The transmission control unit 250 may transmit the risk area information by broadcast.

The second time period calculation unit 222 may calculate the second time period by setting an area where the vehicle 20 moves based on a result of recognition of a position of a roadside strip or a travelling lane which is set on a road.

The object approaching the vehicle 20 may include a pedestrian. The second time period calculation unit 222 may calculate, as the second time period, an expected arrival time period for a virtual pedestrian to reach the movement area of the vehicle 20 from a predetermined point in the area identified by the area identification unit 220. The second time period calculation unit 222 may set a plurality of the predetermined points and calculate the second time period for each of the plurality of predetermined points. The risk area setting unit 223 may set the risk area based on a plurality of the second time periods respectively calculated for the plurality of predetermined points.

The reception control unit 260 is configured to perform control for receiving response information from an external apparatus to the risk area information. The vehicle control unit 208 is configured to perform control of the vehicle 20 based on the response information. For example, the vehicle control unit 208 may control the execution of the driver assistance of the vehicle 20 or the alert for the occupant of the vehicle 20. For example, when the information output apparatus 40 includes a head-up display, the vehicle control unit 208 may cause the head-up display of the vehicle 20*a* to output light for forming a mark as warning information indicating that a pedestrian is present in the risk area. In addition, the vehicle control unit 208 causes the head-up display to output light for forming a mark in a display region corresponding to a position of the risk area where the pedestrian is present. The vehicle control unit 208 may project the light for forming a mark towards a reflective part provided to a windshield of the vehicle 20. It should be noted that the vehicle control unit 208 may output the warning information by a sound or a character.

The reception control unit 260 is configured to perform control for receiving response information indicating the presence of an object in the risk area. The reception control unit 260 may perform control for receiving the response information from the other vehicle 20 present outside the risk area. For example, the reception control unit 260 may perform control for receiving the response information indicating the presence of an object in the risk area from the other vehicle 20 present outside the risk area. In addition, the reception control unit 260 may perform control for receiving the response information from the terminal 82 present in the risk area. It should be noted that the "object" is the pedestrian 80 according to the present embodiment. It should be noted that a notification target may be another vehicle where a person is aboard. The notification target may be mobile equipment such as a mobile terminal possessed by a person.

It should be noted that the information output apparatus 40 is an apparatus configured to output warning information. The information output apparatus 40 may have a human machine interface (HMI) function. The information output apparatus 40 may include a head-up display or a navigation system. The information output apparatus 40 may also be a mobile terminal possessed by an occupant of the vehicle 20. The information output apparatus 40 may be a sound output apparatus configured to output warning information by a sound.

Figure 3:
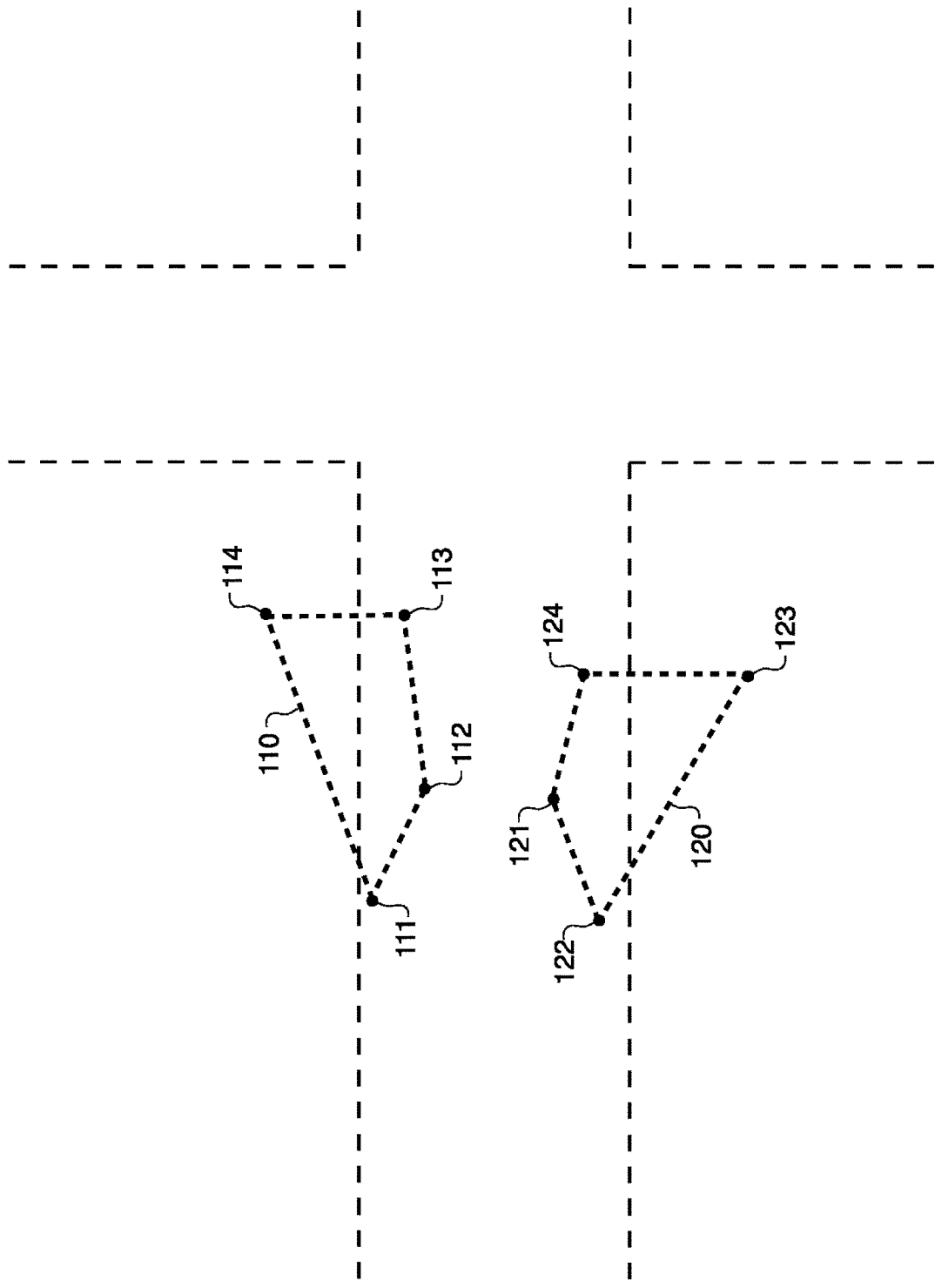

FIG. 3 conceptually illustrates position information of the risk area managed by the control apparatus 24*a*. Here, a case will be illustrated where the non-line-of-sight area 110 and the non-line-of-sight area 120 which are identified by the area identification unit 220 are set as the risk areas.

In the vehicle 20*a*, coordinates of each of four points including a point 111, a point 112, a point 113, and a point 114 which represent a contour of the area 110 are calculated. The area 110 is a closed region formed by linking the coordinates of the point 111, the point 112, the point 113, and the point 114. In addition, the control apparatus 24*a* calculates coordinates of each of four points including a point 121, a point 122, a point 123, and a point 124 which represent a contour of the area 120. The area 120 is a closed region formed by linking the coordinates of the point 121, the point 122, the point 123, and the point 124. The control apparatus 24*a* stores the coordinates of each of the point 111, the point 112, the point 113, and the point 114 in association with an area ID assigned to the area 110. In addition, the control apparatus 24*a* stores the coordinates of each of the point 121, the point 122, the point 123, and the point 124 in association with an area ID assigned to the area 120. The transmission control unit 250 then transmits risk area information including the area IDs and the coordinates indicating the area 110 and the area 120.

When the vehicle 20*d* receives the risk area information, the control apparatus 24*d* analyzes, from an image acquired by a camera mounted on the vehicle 20*d*, an image region where an area surrounded by four points indicated by the coordinates included in the position information is captured, and detects a pedestrian in the area. The transmission control unit 250 transmits the response information including a detection result of the pedestrian in the area surrounded by the four points and the area ID to the vehicle 20*a* corresponding to a transmission source of the risk area information.

In addition, when the terminal 82 receives the risk area information, the terminal 82 determines whether a current position of the terminal 82 is included in an area surrounded by four points indicated by the coordinates included in the position information. When the current position of the terminal 82 is included in the area surrounded by the four points, the terminal 82 transmits the response information including the area ID to the vehicle 20*a* corresponding to the transmission source of the risk area information.

It should be noted that when the risk area is circular, the position information of the risk area may include coordinate information of a central point of the risk area and diameter information of the risk area. When the risk area is polygonal, the position information of the risk area may include coordinate information of a point corresponding to a reference of a polygon and length information of sides such as a width and a height of the risk area. When the risk area is elliptical, the position information of the risk area may include coordinate information of a central point of the risk area and major axis, minor axis, and azimuth angle information.

Figure 4:
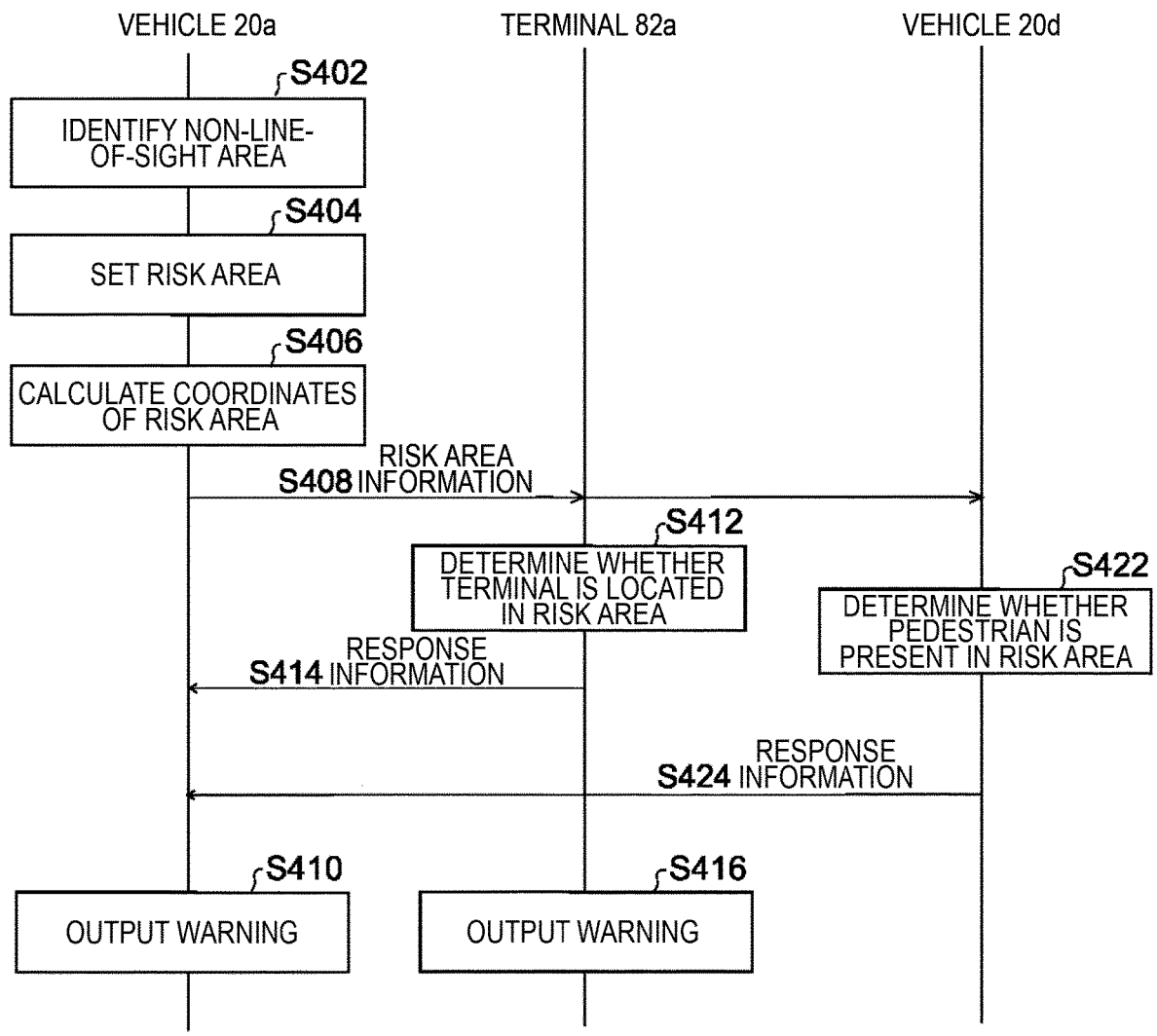
FIG. 4 generally illustrates a flow of processing executed by a vehicle 20a, a terminal 82a, and a vehicle 20d.

FIG. 4 generally illustrates a flow of processing executed by the vehicle 20*a*, the terminal 82*a*, and the vehicle 20*d*. FIG. 4 illustrates a flow of processing in a case where the vehicle 20*a* communicates with the terminal 82*a* and the vehicle 20*d* based on PC5.

In S402, the area identification unit 220 recognizes non-line-of-sight areas in an advancing direction of the vehicle 20*a* from an image acquired from the sensor 29*a*. In S404, the risk area setting unit 223 sets a risk area from among the non-line-of-sight areas recognized in S402. The risk area setting unit 223 selects, as the risk area, an area where the vehicle 20*a* reaches within a predetermined time period among the non-line-of-sight areas recognized in S402. For example, the control apparatus 24*a* calculates an arrival time period that is a time period for the vehicle 20*a* to reach a position in the vicinity of the non-line-of-sight area based on a distance to the non-line-of-sight area which is calculated from at least one of an image acquired by the sensor 29*a* or a distance measured by the sensor 29*a* and a vehicle speed measured by the vehicle speed sensor 26, and sets a line-of-sight area in which the arrival time period is within a predetermined time period as the risk area. It should be noted that the risk area setting unit 223 may set the risk area when it is determined that a pedestrian having a risk of approaching the vehicle 20 may be present in the non-line-of-sight area, and may avoid setting of the risk area when it is determined that a pedestrian having a risk of approaching the vehicle 20 may not to be present in the non-line-of-sight area. This determination will be described in relation to FIG. 5, FIG. 6, and the like.

In S406, the area identification unit 220 calculates coordinate information of the risk area selected in S404. The area identification unit 220 calculates absolute coordinate information of the risk area set in S404 based on coordinate information of the current position of the vehicle 20*a*, and relative coordinates of the risk area while the vehicle 20*a* is set as a reference. The absolute coordinate information of the risk area may be geographic coordinates of the risk area. The absolute coordinate information of the risk area may include latitude information and longitude information of the risk area.

In S408, the transmission control unit 250 transmits risk area information. The risk area information may include an area ID, coordinate information of the risk area, and transmission source information of the risk area information. The area ID is identification information for uniquely identifying the risk area set in S404. The area ID may be identification information decided by the control apparatus 24*a*. The transmission source information is identification information for uniquely identify the vehicle 20*a* corresponding to a transmission source of the risk area information.

In S412, when the risk area information transmitted from the vehicle 20*a* is received, the terminal 82*a* judges whether the terminal 82*a* is located in the risk area. For example, the terminal 82*a* determines whether coordinates of the current position of the terminal 82*a* are in a region set by the coordinate information included in the risk area information. When the terminal 82*a* is located in the risk area, in S414, response information indicating the presence of a pedestrian in the risk area is transmitted to the vehicle 20*a*. The terminal 82*a* includes, in the response information, the area ID included in the risk area information received by the terminal 82a and a terminal ID for uniquely identifying the terminal 82a, and transmits the response information. In addition, in S416, the terminal 82a performs a warning for the pedestrian 80a by a human machine interface (HMI) function of the terminal 82a. It should be noted that in S412, when it is determined that the terminal 82a is not located in the risk area, the terminal 82a discards the received risk area information, does not transmit the response information, and does not output the warning.

In S422, when the control apparatus 24d of the vehicle 20d receives the risk area information transmitted from the vehicle 20a, the control apparatus 24d judges whether a pedestrian is present in the risk area. For example, the control apparatus 24d determines whether a pedestrian is present in a region set by the coordinate information included in the risk area information based on the image acquired by the sensor 29d and distance information. In S424, the control apparatus 24d transmits the response information including a determination result indicating whether a pedestrian is present to the vehicle 20a. The control apparatus 24d includes, in the response information, an area ID included in the received risk area information, a terminal ID for uniquely identifying the vehicle 20d, and presence information indicating whether a pedestrian is present in the risk area, and transmits the response information.

In S410, when the response information transmitted from the terminal 82a is received, the control apparatus 24a causes warning information to be output by the HMI function of the information output apparatus 40. In addition, when the presence information indicating the presence of a pedestrian in the risk area is included in the response information received from the vehicle 20d, the control apparatus 24a causes the warning information to be output by the HMI function of the information output apparatus 40.

Figure 5:
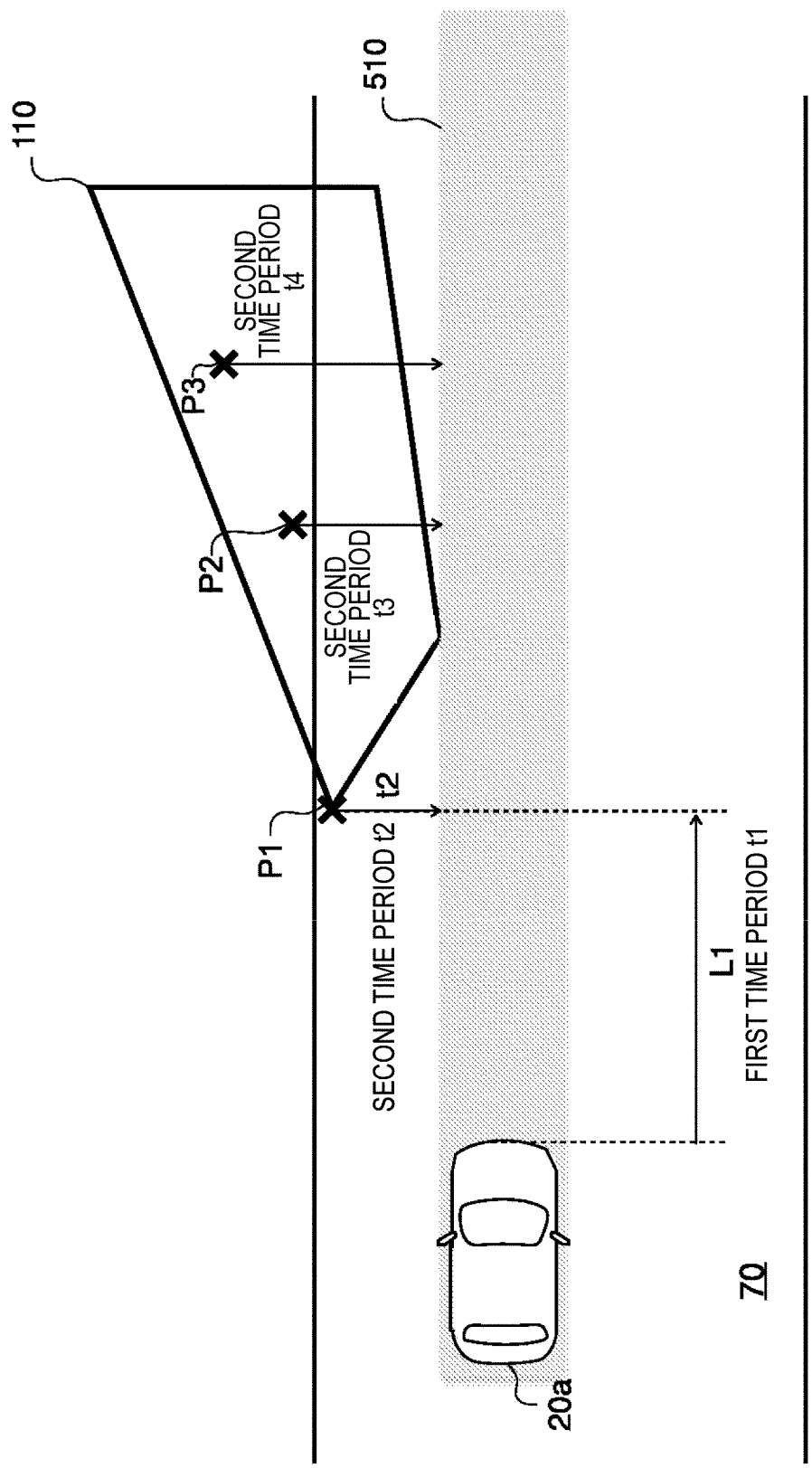
FIG. 5 is a diagram for describing processing for a risk area setting unit 223 to set a risk area.

FIG. 5 is a diagram for describing processing for the risk area setting unit 223 to set the risk area by. When it is assumed that a pedestrian is present in the area 110 that is not on the line of sight, the risk area setting unit 223 sets a risk area in the area 110 by determining whether when a virtual pedestrian assumed to be present is to reach a travelling region 510 of the vehicle 20 in future, the virtual pedestrian might approach the vehicle 20.

In FIG. 5, it is assumed that a virtual pedestrian is present at a position P1. The first time period calculation unit 221 calculates a first time period t1 that is an arrival time period for the vehicle 20 to reach the position P1 in the advancing direction of the vehicle 20. The first time period calculation unit 221 calculates a relative distance to the position P1 in the advancing direction of the vehicle 20 from the current position of the vehicle 20 and the position P1, and calculates a first time period t1 based on the relative distance and the vehicle speed of the vehicle 20 in the advancing direction.

The second time period calculation unit 222 calculates a second time period t2 for the virtual pedestrian to reach the travelling region 510 when the virtual pedestrian walks at a shortest distance from the position P1 towards the travelling region 510 of the vehicle 20 based on position information of the travelling region 510 and position information of P1, and a predetermined walking speed set as a walking speed of a pedestrian. The walking speed of the pedestrian may be a predetermined fixed speed. In addition, the second time period calculation unit 222 may set the travelling region 510 of the vehicle 20 based on a position of a traffic lane which has been recognized from an image picked up by the camera 22. The second time period calculation unit 222 may set the travelling region 510 of the vehicle 20 based on a position of a line of a roadside strip which has been recognized by an image picked up by the camera 22.

When the second time period t2 is shorter than the first time period t1, the risk area setting unit 223 determines that the virtual pedestrian might approach the vehicle 20 when the virtual pedestrian is to reach the travelling region 510 of the vehicle 20. When a difference between the second time period t2 and the first time period t1 is shorter than a predetermined time period threshold, the risk area setting unit 223 may determine that the virtual pedestrian might approach the vehicle 20 when the virtual pedestrian is to reach the travelling region 510 of the vehicle 20.

Similarly as in the processing in a case where it is assumed that the virtual pedestrian is present at the position P1, the risk area setting unit 223 assumes that a virtual pedestrian is present at a position P2, and determines, based on a second time period t3 for the virtual pedestrian present at the position P2 to reach the travelling region 510 and the first time period for the vehicle 20 to reach the position P2 in the advancing direction of the vehicle 20, whether when the virtual pedestrian present at the position P2 is to reach the travelling region 510 of the vehicle 20, the virtual pedestrian might approach the vehicle 20. Similarly, the risk area setting unit 223 assumes that a virtual pedestrian is present at a position P3, and determines, based on a second time period t4 for the virtual pedestrian present at the position P3 to reach the travelling region 510 and the first time period for the vehicle 20 to reach the position P3 in the advancing direction of the vehicle 20, whether when the virtual pedestrian present at the position P3 is to reach the travelling region 510 of the vehicle 20, the virtual pedestrian might approach the vehicle 20.

Figure 6:
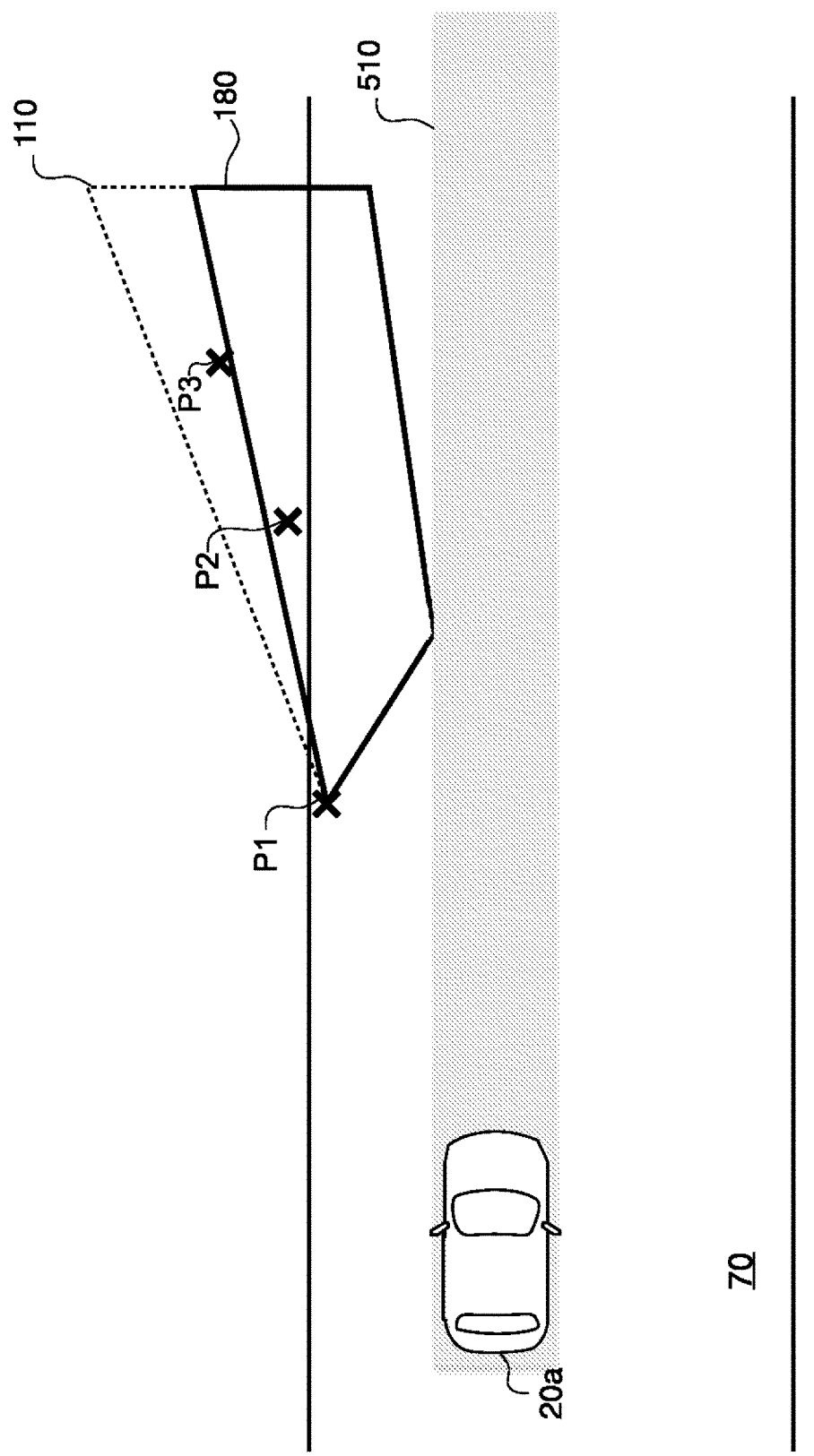
FIG. 6 illustrates one example of a risk area 180 set by the risk area setting unit 223.

FIG. 6 illustrates one example of a risk area 180 set by the risk area setting unit 223. As described in relation to FIG. 5, the risk area setting unit 223 assumes that a virtual pedestrian is present in the area 110, and determines whether the virtual pedestrian might approach the vehicle 20. When it is determined that the virtual pedestrian might approach the vehicle 20, the risk area setting unit 223 then sets the risk area so as to include a assumed position of the virtual pedestrian in the area 110. FIG. 6 illustrates the risk area 180 which is set when it is determined that the virtual pedestrians at the position P1 and the position P2 might approach the vehicle 20 and it is determined that there is no possibility that the virtual pedestrian at the position P3 is to approach the vehicle 20. The risk area setting unit 223 transmits risk area information including coordinate information of vertices of the set risk area 180.

Figure 7:
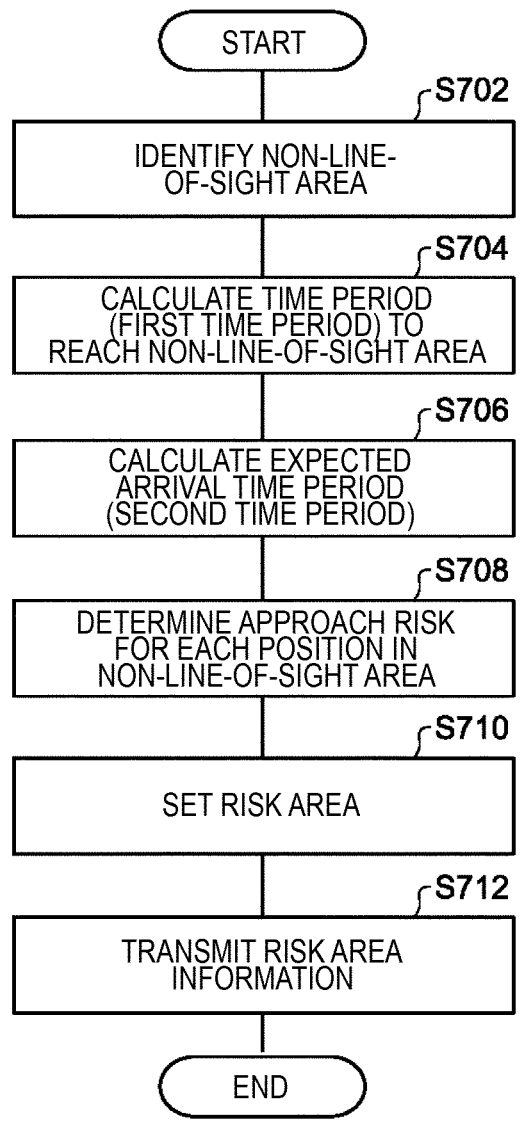

FIG. 7 illustrates a flowchart related to a control method executed by the control apparatus 24a in the vehicle 20a. Processing of this flowchart is started when a non-line-of-sight area is detected.

In S702, the area identification unit 220 identifies a non-line-of-sight area. For example, the area identification unit 220 identifies the non-line-of-sight area based on information of an image picked up by the camera 22, map information, or information received from another vehicle or the base transceiver station 50.

In S704, the first time period calculation unit 221 calculates the first time period that is a time period for the vehicle 20 to reach the non-line-of-sight area. In S706, the second time period calculation unit 222 calculates a second time period that is a time period for a pedestrian to reach the travelling region of the vehicle 20 from each position in the non-line-of-sight area. In S708, the area identification unit 220 determines a risk for the pedestrian to approach the vehicle 20 when it is assumed that the pedestrian is present at each position in the non-line-of-sight area. For example, as described in relation to FIG. 5, the first time period calculation unit 221, the second time period calculation unit 222, and the area identification unit 220 may assume that virtual pedestrians are present at multiple positions in the non-line-of-sight area, and determine whether there is a risk for the virtual pedestrians to approach the vehicle 20.

In S710, the area identification unit 220 sets the risk area based on a determination result in S708. In S712, the transmission control unit 250 transmits the risk area information including the position information of the risk area set by the area identification unit 220, and ends the processing of this flowchart.

It should be noted that as a transmission method of the risk area information, not only a method of directly transmitting the risk area information to the terminal 82 or the other vehicle 20 by PC5 or the like can be adopted as described above, but also a method of transmitting the risk area information via the base transceiver station 50 or an MEC server connect to the base transceiver station 50 can be adopted. For example, when the risk area information is received, the base transceiver station 50 may select the terminal 82 that is set as a transmission destination of the risk area information based on the position information included in the risk area information, and the position information of the terminal 82 managed by the base transceiver station 50. When response information is received from the terminal 82, the base transceiver station 50 may transmit the response information to the vehicle 20 that is a transmission source of the risk area information. When it is determined that the terminal 82 is present in the risk area based on the position information included in the risk area information and the position information of the terminal 82 managed by the base transceiver station 50, the base transceiver station 50 may transmit the response information to the vehicle 20 that is a transmission source of the risk area information. In addition, when the risk area information is received, the base transceiver station 50 may select the other vehicle 20 present in the vicinity of the position of the risk area as the transmission destination of the risk area information based on the position information included in the risk area information and the position information of the other vehicle 20 managed by the base transceiver station 50. When response information is received from the other vehicle 20 at the transmission destination of the risk area information, the base transceiver station 50 may transmit the response information to the vehicle 20 that is the transmission source of the risk area information. When the method of transmitting the risk area information via the base transceiver station 50 is adopted, the base transceiver station 50 may manage the position of the terminal 82 and the position of the vehicle 20 by periodically collecting the position of the terminal 82 and the position of the vehicle 20.

In accordance with the warning system 10 described above, the risk area information can be transmitted at timing at which it is determined that the pedestrian having a possibility that the vehicle 20 is present in the non-line-of-sight area has a risk of approaching the vehicle 20. In addition, in accordance with the warning system 10, an area where a pedestrian might be present with a risk of approaching the vehicle 20 among non-line-of-sight areas can be set as the risk area, and the risk area information including the set position information can be transmitted. Thus, strain of a communication band by frequently transmitting the risk area information can be suppressed. In addition, strain of the communication band due to increase of the response information from the terminal 82 or the other vehicle 20 can be suppressed.

It should be noted that the vehicle 20 is one example of transport equipment. The transport equipment includes a motor vehicle such as a passenger vehicle or a bus, a riding saddle riding type vehicle, a bicycle, or the like. In addition, the movable object includes, in addition to a person, transport equipment such as a motor vehicle like a passenger vehicle or a bus, a saddle riding type vehicle, or a bicycle.

Figure 8:
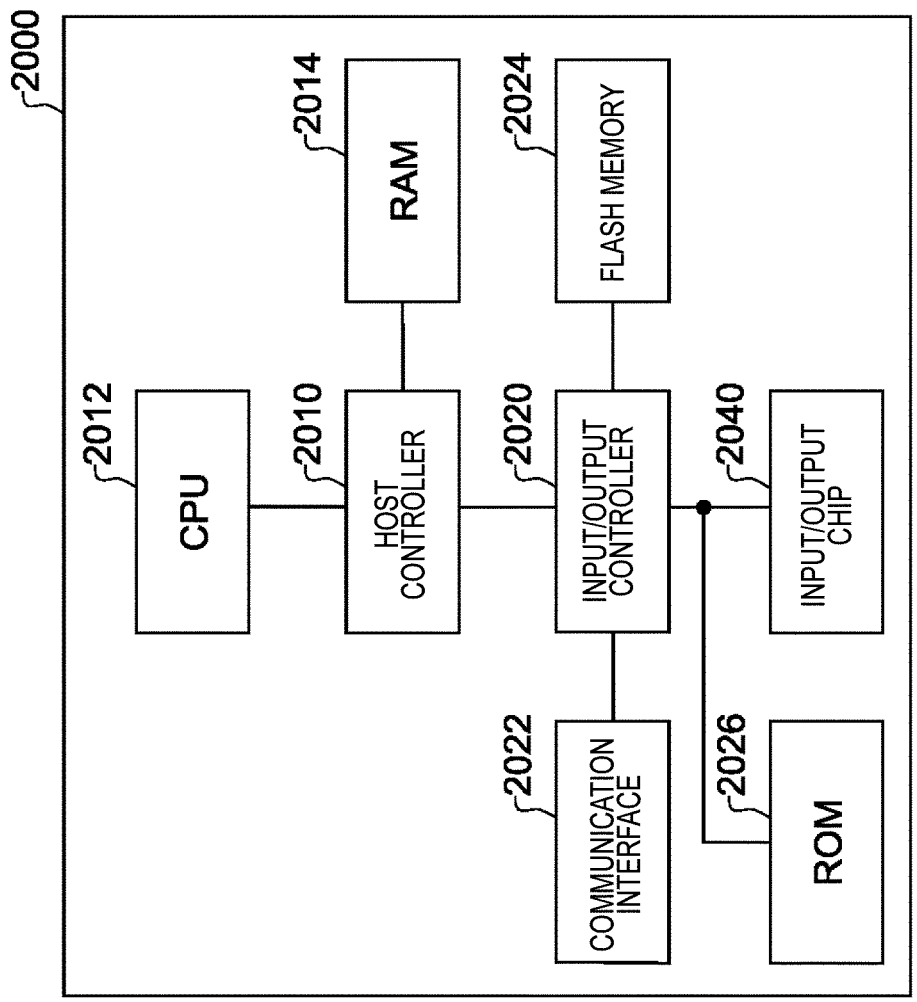
FIG. 8 illustrates an example of a computer 2000.

FIG. 8 illustrates an example of a computer 2000 where a plurality of embodiments of the present invention may be entirely or partially embodied. Programs installed in the computer 2000 can cause the computer 2000 to: function as apparatuses such as the control apparatus 24 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, or an HDMI (registered trademark) port.

The programs are provided via a network or a computer-readable medium such as a CD-ROM, a DVD-ROM, or a memory card. The RAM 2014, the ROM 2026, or the flash memory 2024 is an example of the computer-readable medium. The programs are installed in the flash memory 2024, the RAM 2014, or the ROM 2026, and are executed by the CPU 2012. Information processing written in these programs is read by the computer 2000, and provides cooperation between the programs and the various types of hardware resources described above. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. The communication interface 2022, under the control of the CPU 2012, reads transmission data stored in a transmission buffer processing region provided in a recording medium such as the RAM 2014 and the flash memory 2024, sends the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs to write back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of the plurality of entries described above, an entry with the attribute value of the first attribute specified that meets a condition, read the attribute value of the second attribute stored in above described entry, and thereby acquire the attribute value of the second attribute associated with the first attribute meeting a predetermined condition.

The programs or software module described above may be stored on the computer 2000 or in a computer-readable medium near the computer 2000. A recording medium such as a hard disk or RAM provided in a server system connected to a dedicated communication network or the Internet can be used as the computer-readable medium. The programs stored in the computer-readable medium may be provided to the computer 2000 via the network.

The program that is installed in the computer 2000 and causes the computer 2000 to function as the control unit 200 may instruct the CPU 2012 or the like to cause the computer 2000 to function as each unit of the control unit 200. The information processing written in these programs are read by the computer 2000 to cause the computer to function as each unit of the control unit 200, which is specific means realized by the cooperation of software and the various types of hardware resources described above. Then, these specific means implement operations or processing of information according to the intended use of the computer 2000 in the present embodiment, so that the control unit 200 is constructed as a specific control unit according to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium.

The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable medium may include any tangible device capable of storing an instruction executed by an appropriate device, so that the computer-readable medium having the instruction stored thereon constitutes at least a part of a product including an instruction that may be executed in order to provide means to execute an operation specified by a processing procedure or a block diagram. Examples of the computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include either source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 warning system
20 vehicle
21 radar
22 camera
24 control apparatus
25 GNSS reception unit
26 vehicle speed sensor
29 sensor
30 driver assistance control apparatus
40 information output apparatus
48 communication apparatus
50 base transceiver station
70, 72 road
80 pedestrian
82 terminal
80 pedestrian
90 construction
110, 120, 130 area
111, 112, 113, 114, 121, 122, 123, 124 point
200 control unit
208 vehicle control unit
210 image acquisition unit
220 area identification unit
221 first time period calculation unit
222 second time period calculation unit
223 risk area setting unit
250 transmission control unit
260 reception control unit
280 storage unit
2000 computer
2010 host controller
2012 CPU
2014 RAM
2020 input/output controller
2022 communication interface
2024 flash memory
2026 ROM
2040 input/output chip

What is claimed is:

1. A control apparatus comprising:
at least one processor, wherein the at least one processor is configured to:
identify an area for which an analysis is not required, based on information of an image captured from a position of a movable object by an image capturing unit mounted on the movable object;
identify a first time period that is a time period for the movable object to reach the identified area;
calculate a second time period that is an arrival time period to reach a movement area of the movable object from a position in the identified area;
set, in the identified area, a risk area where an object approaching the movable object may be present, based on the first time period and the second time period and on the identified area;
control transmission of risk area information including position information of the risk area;
perform control for receiving response information from an external apparatus to the risk area information; and
perform control of the movable object based on the response information.

2. The control apparatus according to claim 1, wherein the area for which the analysis is not required is a non-line-of-sight area that is not on a line of sight from the position of the movable object.

3. The control apparatus according to claim 2, wherein the at least one processor is further configured to judge the non-line-of-sight area by recognizing a predetermined object using an image.

4. The control apparatus according to claim 2, wherein the at least one processor is further configured to transmit, without designating a destination, a plurality of latitude and longitude coordinates indicating the risk area.

5. The control apparatus according to claim 2, wherein the at least one processor is further configured to calculate the second time period by setting an area where the movable object moves based on a result of recognition of a position of a roadside strip or a travelling lane which is set on a road.

6. The control apparatus according to claim 1, wherein the at least one processor is further configured to transmit, without designating a destination, a plurality of latitude and longitude coordinates indicating the risk area.

7. The control apparatus according to claim 1, wherein the at least one processor is further configured to calculate the second time period by setting an area where the movable object moves based on a result of recognition of a position of a roadside strip or a travelling lane which is set on a road.

8. The control apparatus according to claim 1, wherein
the object approaching the movable object includes a pedestrian, and
the at least one processor is further configured to calculate, as the second time period, an expected arrival time period for a virtual pedestrian to reach the movement area of the movable object from a predetermined point in the identified area.

9. The control apparatus according to claim 8, wherein the at least one processor is further configured to:
set a plurality of the predetermined points and calculate the second time period for each of the plurality of predetermined points, and
set the risk area based on a plurality of the second time periods respectively calculated for the plurality of predetermined points.

10. The control apparatus according to claim 1, wherein the at least one processor is further configured to control execution of driver assistance of the movable object or an alert for an occupant of the movable object.

11. The control apparatus according to claim 1, wherein the at least one processor is further configured to perform control for receiving the response information indicating that the object is present in the risk area.

12. The control apparatus according to claim 1, wherein the at least one processor is further configured to perform control for receiving the response information from another movable object present outside the risk area.

13. The control apparatus according to claim 12, wherein the at least one processor is further configured to perform control for receiving the response information indicating that the object is present in the risk area from the other movable object present outside the risk area.

14. The control apparatus according to claim 1, wherein the at least one processor is further configured to perform control for receiving the response information from another movable object present in the risk area.

15. The control apparatus according to claim 1, wherein the position information of the risk area includes a plurality of pieces of coordinate information indicating a range of the risk area.

16. The control apparatus according to claim 1, wherein the movable object is a vehicle.

17. A movable object comprising the control apparatus according to claim 1.

18. A control method comprising:
- identifying an area for which an analysis is not required, based on information of an image captured from a position of a movable object by an image capturing unit mounted on the movable object;
- identifying a first time period that is a time period for the movable object to reach the identified area;
- calculating a second time period that is an arrival time period to reach a movement area of the movable object from a position in the identified area;
- setting, in the identified area, a risk area where an object approaching the movable object may be present, based on the first time period and the second time period and on the identified area;
- controlling transmission of risk area information including position information of the risk area;
- performing control for receiving response information from an external apparatus to the risk area information; and
- performing control of the movable object based on the response information.

19. A non-transitory computer-readable storage medium having stored thereon a program that, when executed by a computer, causes the computer to perform operations comprising:
- identifying an area for which an analysis is not required, based on information of an image captured from a position of a movable object by an image capturing unit mounted on the movable object;
- identifying a first time period that is a time period for the movable object to reach the identified area;
- calculating a second time period that is an arrival time period to reach a movement area of the movable object from a position in the identified area;
- setting, in the identified area, a risk area where an object approaching the movable object may be present, based on the first time period and the second time period and on the identified area;
- controlling transmission of risk area information including position information of the risk area;
- performing control for receiving response information from an external apparatus to the risk area information; and
- performing control of the movable object based on the response information.

* * * * *